(12) United States Patent
Gruber

(10) Patent No.: US 12,264,909 B2
(45) Date of Patent: Apr. 1, 2025

(54) TYPE OF DEVICE(S) FOR AUTOMATICALLY MONITORING A COATING AND/OR STRUCTURE APPLIED TO A SUBSTRATE WITH DETERMINATION OF REFLECTIVE PROPERTIES AND/OR GEOMETRIC DIMENSIONS, AND A CORRESPONDING METHOD

(71) Applicant: QUISS QUALITAETS-INSPEKTIONSSYSTEME UND SERVICE GMBH, Puchheim (DE)

(72) Inventor: Bernhard Gruber, Stockdorf (DE)

(73) Assignee: QUISS QUALITAETS-INSPEKTIONSSYSTEME UND SERVICE GMBH, Puchheim (DE)

( * ) Notice: Subject to any disclaimer, the term of this patent is extended or adjusted under 35 U.S.C. 154(b) by 278 days.

(21) Appl. No.: 17/914,284

(22) PCT Filed: Mar. 25, 2021

(86) PCT No.: PCT/EP2021/057774
§ 371 (c)(1),
(2) Date: Sep. 23, 2022

(87) PCT Pub. No.: WO2021/191363
PCT Pub. Date: Sep. 30, 2021

(65) Prior Publication Data
US 2023/0349692 A1 Nov. 2, 2023

(30) Foreign Application Priority Data
Mar. 25, 2020 (DE) .......... 102020203850.3

(51) Int. Cl.
G01B 11/25 (2006.01)
G01N 21/17 (2006.01)
(Continued)

(52) U.S. Cl.
CPC ............. *G01B 11/25* (2013.01); *G01N 21/17* (2013.01); *G01N 21/41* (2013.01); *G01N 21/55* (2013.01);
(Continued)

(58) Field of Classification Search
CPC ......... G01B 11/25; G01B 11/00; G01B 11/02; G01N 21/17; G01N 21/41; G01N 21/55;
(Continued)

(56) References Cited

U.S. PATENT DOCUMENTS

| 8,538,125 B2 | 9/2013 | Linnenkohl et al. |
| 2012/0229606 A1* | 9/2012 | Rodrigue ............. G01B 11/245 348/46 |

(Continued)

FOREIGN PATENT DOCUMENTS

| DE | 10 2006 018 558 A1 | 10/2007 |
| DE | 103 61 018 B4 | 5/2016 |

(Continued)

OTHER PUBLICATIONS

PCT Written Opinion Dated Feb. 22, 2022, Application No. PCT/EP2021/075774, Applicant Quiss Qualitaets-Inspektionssysteme Und Service, 6 Pages.

(Continued)

*Primary Examiner* — Michelle M Iacoletti
*Assistant Examiner* — Judy Dao Tran
(74) *Attorney, Agent, or Firm* — BROOKS KUSHMAN P.C.

(57) ABSTRACT

A material application and analysis device may comprise at least one analysis device for optically monitoring at least a
(Continued)

first material application and a second material application, and a material application element for applying the second material application to a substrate provided with the first material application at least in sections. The material application element is arranged between a first radiation source and detection device assembly and a second radiation source and detection device assembly, wherein by the first radiation source and detection device assembly the first material application is detectable and wherein by the second radiation source and detection device assembly the second material application is detectable. Furthermore, first image data are processed and second image data are processed, and the processed first image data are evaluated with respect to a physical parameter and the processed second image data are evaluated with respect to a geometrical parameter.

19 Claims, 7 Drawing Sheets

(51) Int. Cl.
  *G01N 21/41* (2006.01)
  *G01N 21/55* (2014.01)
  *G01N 21/88* (2006.01)
(52) U.S. Cl.
  CPC . *G01N 21/8851* (2013.01); *G01N 2021/1765* (2013.01); *G01N 2021/4153* (2013.01); *G01N 2021/8887* (2013.01)

(58) Field of Classification Search
  CPC ....... G01N 21/8851; G01N 2021/1765; G01N 2021/4153; G01N 2021/8887; G01N 2021/8427; G01N 2021/8438; G01N 21/956; B05C 5/0216; B05C 11/1005
  See application file for complete search history.

(56) References Cited

U.S. PATENT DOCUMENTS

| | | | |
|---|---|---|---|
| 2013/0057678 A1* | 3/2013 | Prior Carrillo .... | G01N 21/8806 348/125 |
| 2015/0254835 A1 | 9/2015 | Dorris et al. | |

FOREIGN PATENT DOCUMENTS

| | | | |
|---|---|---|---|
| DE | 102016007586 A1 * | 12/2017 | |
| JP | 2007 263599 A | 10/2007 | |
| JP | 2011 038773 A | 2/2011 | |
| WO | 2019/120557 A1 | 6/2019 | |

OTHER PUBLICATIONS

PCT International Preliminary Report on Patentability (with English Translation) Dated Jul. 1, 2022, Application No. PCT/EP2021/057774, Applicant Quiss Qualitaets-Inspektionssysteme Und Service Gmbh, 19 Pages.

* cited by examiner

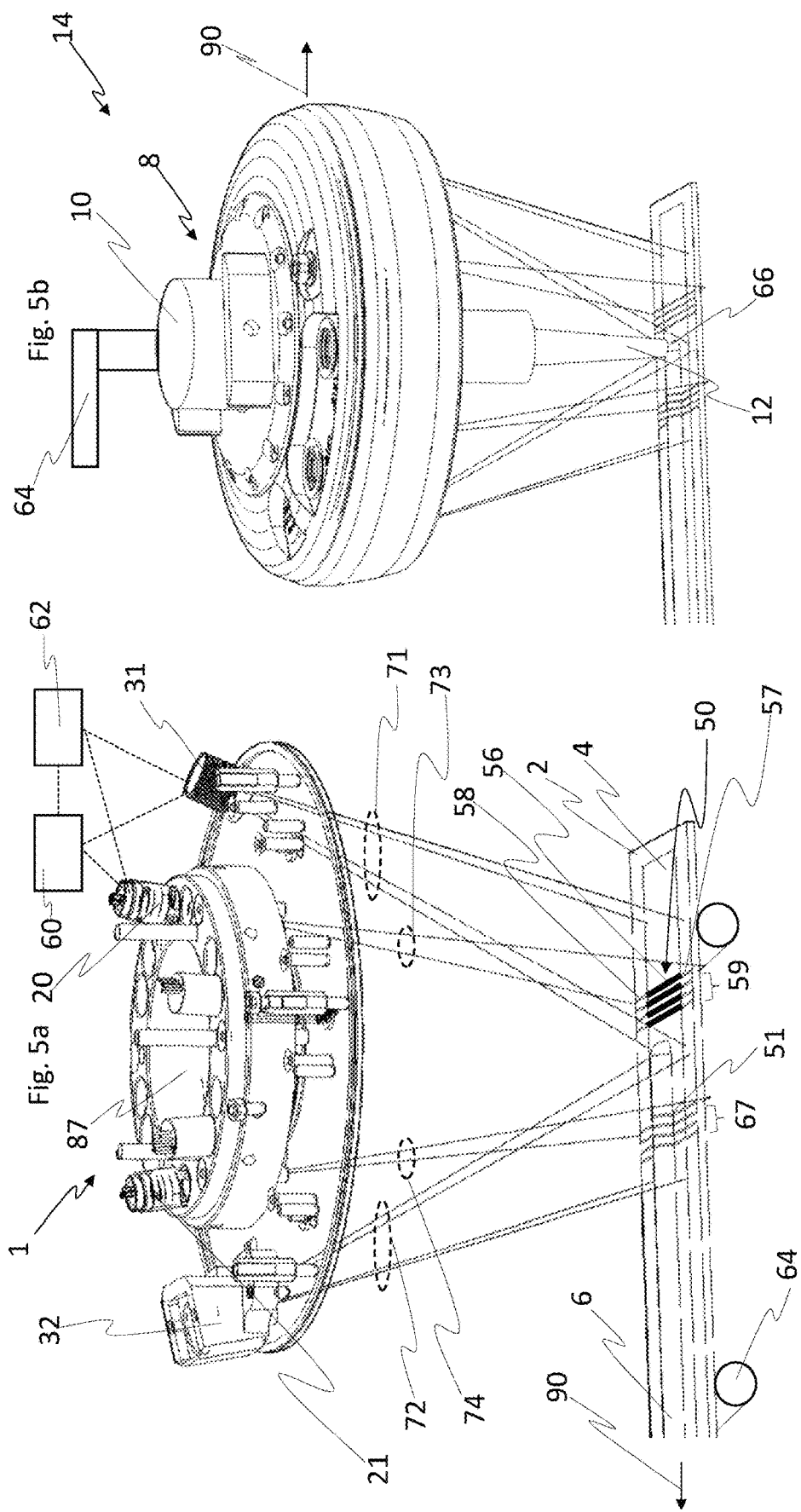

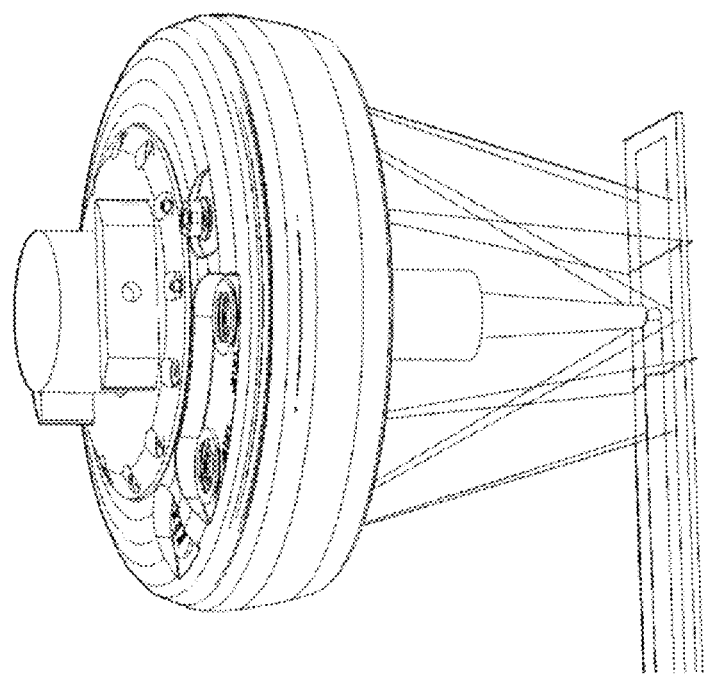
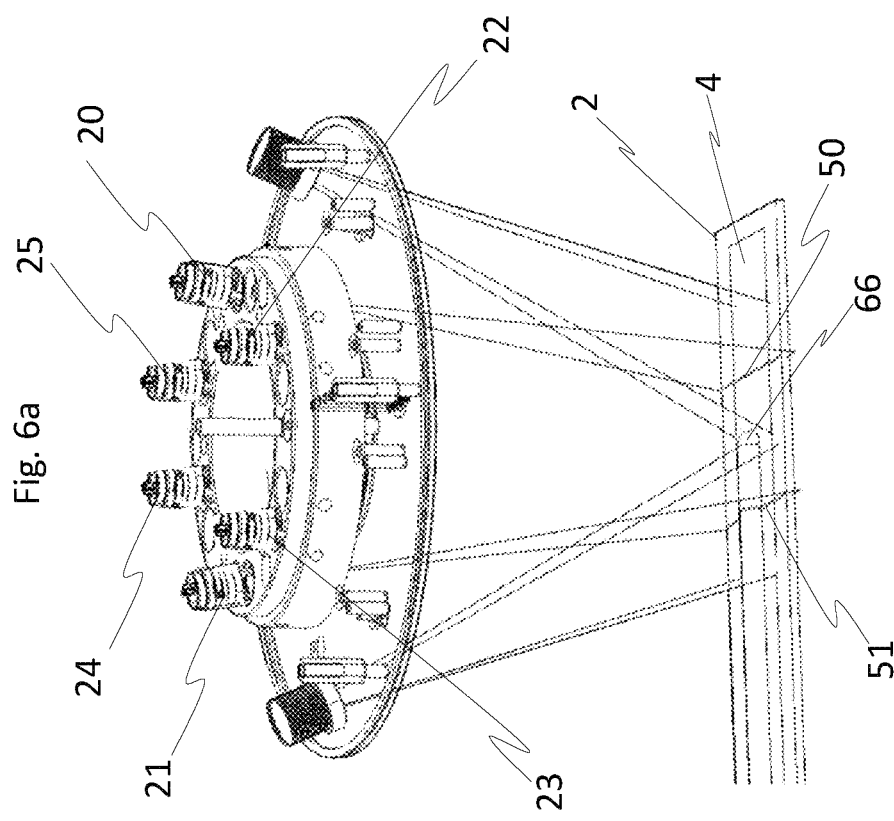

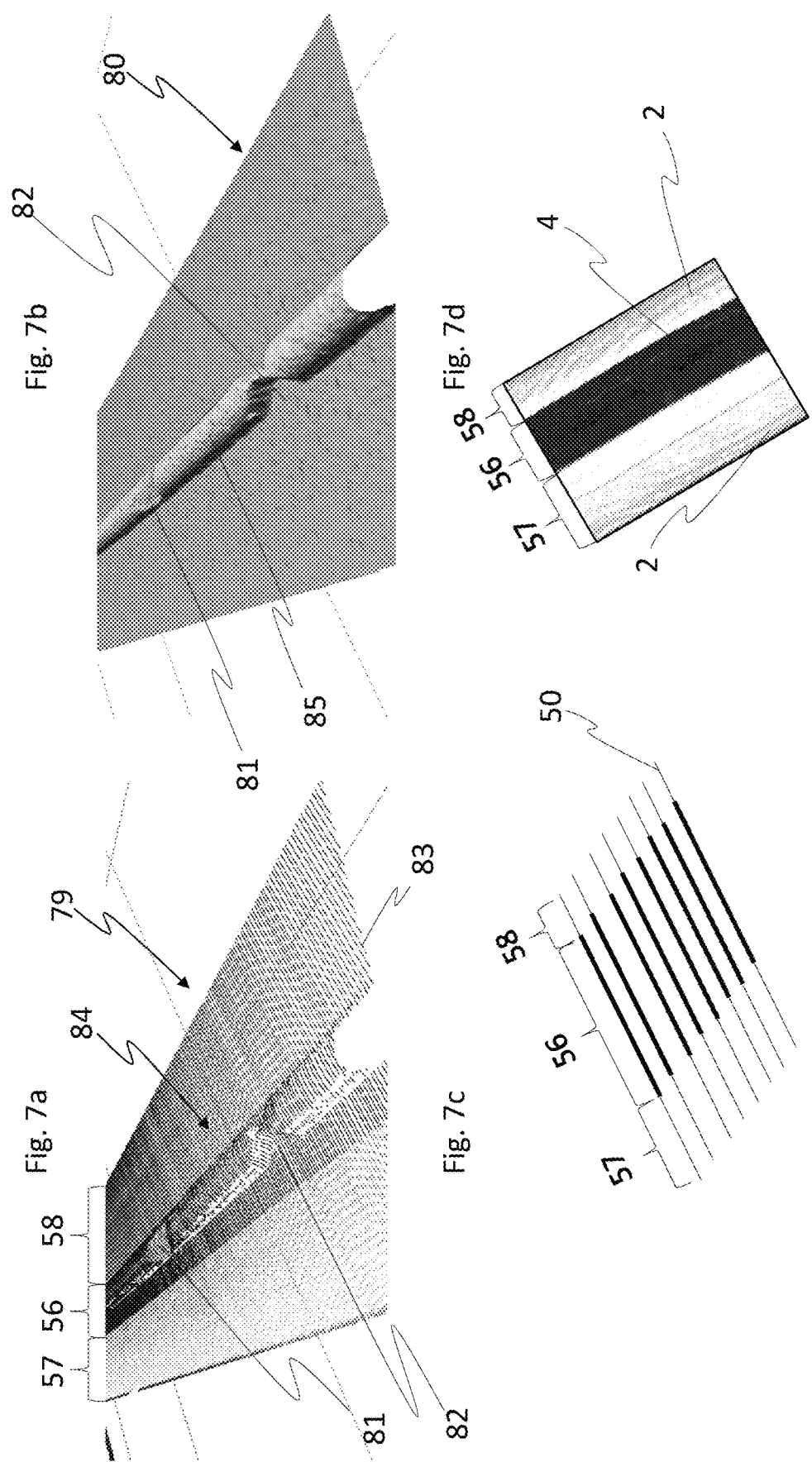

TYPE OF DEVICE(S) FOR AUTOMATICALLY MONITORING A COATING AND/OR STRUCTURE APPLIED TO A SUBSTRATE WITH DETERMINATION OF REFLECTIVE PROPERTIES AND/OR GEOMETRIC DIMENSIONS, AND A CORRESPONDING METHOD

CROSS-REFERENCE TO RELATED APPLICATIONS

This application is the U.S. national phase of PCT Application No. PCT/EP2021/057774 filed on Mar. 25, 2021, which claims priority to German Patent Application No. DE 10 2020 203 850.3 filed on Mar. 25, 2020, the disclosures of which are incorporated in their entireties by reference herein.

TECHNICAL FIELD

The present invention relates to an analysis device for optically monitoring at least two material applications which can be or are applied or produced on a substrate, to a material application and analysis device, to an installation comprising a material application and analysis device, and to a method for generating and monitoring a substrate coating.

BACKGROUND

For the geometrical determination of an applied structure or adhesive track or for checking the correct application of a coating, surface illumination or directional forms of illumination have been used so far. The reflection of the substrate surface as well as the area or directional illumination units with the applied structure or coating is recorded by one or more cameras and automatically evaluated by a computer unit.

A structure applied to a substrate is optically recorded according to the following prior art and evaluated with respect to a parameter: DE 103 61 018 B4, DE 10 2006 018 558 A1, DE 10 2016 007 586 A1.

In currently known systems, methods based on reflective properties are used for a surface coating. In addition to one to several cameras, these include surface illumination (see DE 103 61 018 B4). An applied structure that comprises a three-dimensional shape (e.g., an adhesive or sealant track or a triangular track such as is used in automotive engineering for bonding panes) can be detected as a 2D structure using one to several cameras and area illumination. However, the height and volume of the structure cannot be captured at the same time. For a three-dimensional evaluation of an applied structure, a stereo or triangulation unit is mainly used. The 3D structure is detected by deflecting the projected illumination (projector, LED or light lines) at a predefined angle to the camera (triangulation angle). This in turn does not allow the simultaneous detection of a surface coating, as this does not contain any height information. A projected light line, for example, is not deflected because the surface coating produces no change in height or only a small change. Thus, different methods and systems are currently used for the respective object.

SUMMARY

It is the object of the present invention to provide a device and a method for the advantageous, in particular faster, detection or recognition of a surface coating applied to a substrate and of a structure applied to a substrate.

The aforementioned object is solved according to the invention by an analysis device according to the disclosure. The analysis device according to the disclosure is preferably an analysis device for optically monitoring at least two material applications which can be or are applied or produced on a substrate. A first material application preferably comprises a height of less than 0.5 mm and a second material application comprises a height which corresponds to a multiple of the height of the first material application, the height of the second material application comprising more than 0.5 mm, the second material application being particularly preferably applied to the first material application. The first material application can, for example, be a primer or coating. Alternatively, however, it is also possible that a first material modification is provided or effected instead of the first material application. In this context, material modification is to be understood, for example, as a surface change of the substrate, preferably effected in sections, in particular as a result of a mechanical or machining surface treatment. The material modification can thus be understood, for example, as roughening, in particular with respect to the non-roughened or less roughened areas of the substrate, or as polishing, in particular with respect to the non-polished or less polished areas of the substrate.

The second material application can preferably be formed as an adhesive bead, adhesive track, adhesive seam, lubrication track, in particular grease track, or sealant seam or sealant track or a weld seam.

The substrate is preferably a component. The substrate, in particular the component, preferably comprises a polymer material, a metallic material, a glass-like material, a semiconductor material, an electrically non-conductive material, a fiber material, in particular FRP, a ceramic material, or a plurality of these materials and/or combinations of materials. Preferably, the substrate, in particular the component, is metallic by a majority of its mass. Preferably, the substrate, in particular the component, is a body part or frame part, in particular of a vehicle, in particular of a car or truck. Preferably, the substrate, in particular the component, is a window or a roof or a door of a vehicle, in particular a car or truck.

The analysis device according to the disclosure comprises a first radiation source and detection device assembly, the first radiation source and detection device assembly comprising at least a first radiation source for projecting at least a first line of light onto the first material application and a first optical detection device associated with the first radiation source for detecting the first line of light and generating first image data, said first image data representing said detected first light line, said first radiation source being fixedly aligned with respect to said first optical detection means. Further, the analysis device comprises a second radiation source and detection device assembly, the second radiation source and detection device assembly comprising at least one second radiation source for projecting at least one further line of light onto the second material application and a second optical detection device associated with the second radiation source for detecting the further line of light and generating second image data, said second image data representing said detected further light line, said second radiation source being fixedly aligned with respect to said second optical detection means, said first image data representing a physical parameter of said first light line detected by said first optical detection means, and said second image data representing a geometric parameter of said further light line detected by said second optical detection means. Further, the analysis device comprises processing means for processing the first image data generated by the first detecting means and the second image data generated by the second detecting means. The first radiation source and detection device assembly and the second radiation source and detection device assembly are particularly preferably of identical construction. It is possible here that one or more further light lines are generated simultaneously by the first radiation source in addition to the first light line. This can also apply analogously to a second radiation source, third radiation source, fourth radiation source, fifth radiation source and/or sixth radiation source.

In addition or alternatively, the analysis device can comprise an evaluation device for evaluating the first image data generated by the first detection device and the second image data generated by the second detection device, the evaluation device preferably comprising evaluation means for parameter-dependent evaluation of the first image data, in particular the 2D image data and the second image data, in particular the 3D image data, wherein either the first image data or the second image data are evaluated with respect to a physical parameter and wherein the image data which are not evaluated with respect to the physical parameter are evaluated with respect to a geometric parameter. The first image data or the second image data can thus be evaluated with respect to a first parameter and wherein the first image data or the second image data are evaluated with respect to a second parameter, wherein the first image data and the second image data are evaluated only with respect to the first parameter or the second parameter and wherein the first image data and the second image data are evaluated with respect to different parameters.

Furthermore, the analysis device preferably comprises a control device for driving the first radiation source and detection device assembly and for driving the second radiation source and detection device assembly, wherein the first radiation source and detection device assembly and preferably the second radiation source and detection device assembly can each be driven by the control device, in particular with a time delay or alternately.

The first detection device generates, in particular in dependence on a first configuration of the substrate, the first image data and the second detection device generates, in particular in dependence on a further configuration of the substrate, the second image data.

This solution is advantageous, since by means of a device, in particular the analysis device, in preferably one working step, several analysis tasks, in particular of different material applications, can be effected or carried out. Thus, a device is provided which represents only one sensor system and yet enables the simultaneous detection and/or analysis of several, in particular at least or exactly two, mutually different material applications applied to a substrate, in particular primer and structure applied thereon. Thus, acquisitions and/or analyses regarding the first material application and the second material application can be performed in the same time interval. Preferably, the image acquisition is performed alternately, in particular faster than 1 Hz or faster than 100 Hz or faster than 200 Hz or faster than 500 Hz, in particular up to 1000 Hz or 2000 Hz.

The solution is further advantageous because the substrate position, the reflection of the coating, the width of the second material application, in particular the applied structure, and/or the height of the second material application, in particular the applied structure, and/or the volume of the second material application, in particular the applied structure, in particular in each case with respect to the applied length of the second material application, in particular the applied structure, including the height, the width and the profile or the shape of the second material application, in particular the applied structure, and/or the position of the second material application, in particular the applied structure, on the substrate can be determined.

In the case that the material application does not produce a substantial change in height, as is preferably caused by the first material application, processing of the first image data is preferably performed with a processing device or image data processing device and/or analysis of the processed first image data is performed with an evaluation device or image data evaluation device, in particular the image data analysis device. image data evaluation device, in particular the evaluation means, in particular the image evaluation algorithm, wherein the processing device or image data processing device and/or the evaluation device or image data evaluation device, in particular the evaluation means, in particular the image evaluation algorithm, is configured for evaluating a physical parameter, in particular the reflection behavior of the substrate surface, in particular the surface modification and/or the first material application. Insofar as the applied structure produces a change in height, as is preferably brought about by the second material application, a processing of the second image data or an analysis of the processed first image data is preferably carried out with a processing device or image data processing device and/or evaluation device or image data evaluation device configured as a stereo or triangulation unit (3D), in particular evaluation means, in particular image evaluation algorithm.

Further advantageous embodiments are the subject of the following description parts and/or the subclaims.

In the context of the present disclosure, light lines are generated which may preferably be designated as LED light line or LED line or laser light line or laser line. In the case of LED light line(s) or LED line(s), the respective radiation source is an LED unit and in the case of LED light line(s) or light line(s), the respective radiation source is a laser unit.

According to a preferred embodiment of the present disclosure, the physical parameter is the strength of reflected light from a single light line. Additionally or alternatively, the physical parameter is the strength of reflected light from a plurality of light lines detected in succession, wherein the first image data representing the individual respective light lines detected in a defined section of the substrate are processed, in particular interconnected, to generate 2D image data. This embodiment is advantageous because the individual captures or the individual scans of the light lines or a selection of light lines, provide an image data source for generating 2D image data. The 2D image data may have smoothing or interpolation or connection between light lines represented by the image data. Preferably, successively acquired image data representing successively generated light lines are aligned and/or connected to each other to generate the 2D image data.

A reference strength value or reference strength value range is registered according to another preferred embodiment of the present disclosure. Preferably, the evaluation of the 2D image data with respect to the strength of the reflected light comprises a comparison with the reference strength value or the reference strength value range, preferably determining whether the detected strength of the reflected light corresponds to the reference strength value or lies in the reference strength value range or whether the detected strength of the reflected light deviates from the reference strength value or lies outside the reference strength value range. This embodiment is advantageous because the 2D image data can preferably be analyzed in a spatially resolved manner and thus a defective, faulty or defective location or a defective, faulty or defective area of the first material application can be quickly and unambiguously identified and preferably locally assigned.

According to a further preferred embodiment of the present disclosure, the geometric parameter is the shape of the light line. Additionally or alternatively, the geometric parameter is the shape from a plurality of light lines detected one after the other, wherein the second image data representing the individual respective light lines detected in a defined section of the substrate are processed, in particular interconnected, to generate 3D image data. This embodiment is advantageous because the individual captures of the light lines or the individual scans of the light lines or a selection of light lines, respectively, provide an image data source for generating 3D image data. The 3D image data may comprise smoothing or interpolation or connection between light lines represented by the image data. Preferably, successively acquired image data representing successively generated light lines are aligned and/or connected to each other to generate the 3D image data.

A reference shape value or a reference shape value range is registered according to a further preferred embodiment of the present disclosure. The evaluation of the 3D image data preferably comprises, with respect to the shape of the light lines, a comparison with the reference shape value or the reference shape value range, wherein it is determined whether the detected shape of the light lines corresponds to the reference shape value or lies within the reference shape value range, or whether the detected shape of the light lines deviates from the reference shape value or lies outside the reference shape value range. This embodiment is advantageous because the 3D image data can preferably be analyzed in a spatially resolved manner and thus a defective, faulty or defective location or a defective, faulty or defective area of the second material application can be quickly and unambiguously identified and preferably locally assigned.

In addition to the first and second radiation source and detection device assemblies, according to another preferred embodiment of the present disclosure, a third and/or fourth and/or fifth and/or sixth radiation source and detection device assembly may be provided. Preferably, all, in particular all six, radiation source and detection device assemblies are arranged on a circular path and thus around a center. This embodiment is advantageous because the first material deposition and/or the second material deposition can have a course deviating from a purely straight course and yet a very precise analysis is possible.

In accordance with another preferred embodiment of the present disclosure, the control means causes re-registration of one of the radiation source and detection device assemblies as the first radiation source and detection device assembly and/or re-registration of one of the remaining radiation source and detection device assemblies as the second radiation source and detection device assembly, depending on the relative positions of the individual radiation source and detection device assemblies to the first and/or second material application. This embodiment is advantageous because, depending on the progression of the first and/or second material application, a defined aligned radiation source and detection device assembly can effect detection of the first or second material application. The definedly aligned radiation source and detection device assembly is thereby preferably aligned with respect to the longitudinal extension direction of the first and/or second material application at the point of intersection between the first and/or second material application and the light line of the radiation source and detection device assembly, that the light line is inclined with respect to the longitudinal direction of extension of the first and/or second material application at an angle of more than 20° and/or of less than 90°, in particular of more than 30° or of more than 40° or of more than 50° or of more than 60° or of more than 70° or of more than 80°, with respect to the light line projected by the radiation source and detection device assembly onto the first and/or second material application and preferably extending straight. Thus, the first image data detected in different portions of the substrate are preferably always in areas of comparable orientation. This also applies to the second image data detected in different portions of the substrate.

Each radiation source and acquisition device assembly is controllable to generate image data in accordance with a further preferred embodiment of the present disclosure. Preferably, a sequence for driving the radiation source and detection device assembly is predetermined, wherein per sequence all radiation source and detection device assemblies are driven, in particular exactly once, for respectively generating a light line and for detecting the respective light line, wherein exclusively image data of the radiation source and detection device assembly registered as first radiation source and detection device assembly are used for generating the 2D data and wherein exclusively image data of the radiation source and detection device assembly registered as second radiation source and detection device assembly are used for generating the 3D data. This embodiment is advantageous, since with a high frequency, in particular more than 50 Hz or more than 100 Hz or with 200 Hz or with more than 200 Hz, in particular with or up to 1000 Hz or with more than 1000 Hz, in particular up to 2000 Hz or up to 5000 Hz, and/or complex courses of the first and/or second material application and/or a high relative speed, in particular more or up to 0.1 m/s or more or up to 0.5 m/s or more or up to 1 m/s or more or up to 1.5 m/s or more or up to 2 m/s, between the analysis device and the substrate, a precise analysis of the first and/or second material application is possible.

The above object is also solved according to the invention by a material application and analysis device according to the disclosure. The material application and analysis device according to the invention preferably comprises at least one previously described analysis device or analysis device according to the disclosure. Furthermore, the material application and analysis device comprises a material application element for applying the second material application to a substrate provided with the first material application at least in sections. The material application means is preferably disposed between the first radiation source and detection means assembly and the second radiation source and detection means assembly. By means of the first radiation source and detection device assembly, the first material application is preferably detected, and by means of the second radiation source and detection device assembly, the second material application is preferably detected, wherein the first image data is processed, and wherein the second image data is processed, wherein the processed first image data is evaluated with respect to the physical parameter, and wherein the processed second image data is evaluated with respect to the geometric parameter. According to a further preferred embodiment of the present disclosure, the material application element is configured for applying a material bead, in particular a continuous material bead. Additionally or alternatively, however, it is possible for the material application element to be configured for applying or generating a plurality of material applications, in particular punctiform or locally limited material applications.

The device according to the disclosure thus preferably has at least one application device for applying or producing the applied structure, an illumination device which is attached to the application device or to a support structure of the application device, at least two optical detection devices in the form of cameras for optically detecting the applied surface coating or the applied structure, which are preferably mounted on the application device or the supporting structure of the application device in an offset manner with respect to the illumination device, and an image evaluation unit for recognizing the applied surface coating or structure, which is coupled to the cameras. The illumination unit preferably emits one or more light paths, which are respectively projected onto the substrate and the applied surface coating or structure, preferably immediately before and after application, and wherein the one or more light paths projected onto the substrate and the applied surface coating or applied structure, preferably immediately before and after the application of the applied structure, is or are detected online by the cameras and the image evaluation unit in such a way that the image evaluation unit detects the change in the projected light path or light line or light paths or light lines or light lines or light paths or light lines or light lines or light lines or light lines or light lines or light lines or light lines or light lines or light lines or light lines or light lines or light lines or light lines or light lines or light lines or light lines or light lines or light lines or light lines or light lines or light lines or light lines or light lines or light lines or the image evaluation unit uses the change in the projected light path or light lines by means of calculation methods to determine at least one of the following features of the applied structure: the substrate position, the reflection of the coating, the width of the applied structure and/or the height of the applied structure and/or the volume of the applied structure, in particular in each case with respect to the applied length of the applied structure including the height, the width and the profile or the shape of the applied structure and/or the position of the applied structure on the substrate. The cameras can be designed as CCD or CMOS cameras.

According to the disclosure, the evaluation unit not only detects the deflection of the illumination unit by an applied structure (triangulation), but also the strength of the reflection of the illumination on the substrate surface or the applied surface coating or the applied structure. This solution is very advantageous because it allows the 3D structure of an applied structure as well as an applied surface coating to be detected and evaluated with one arrangement. No different arrangements and methods are required for this.

The above-mentioned object is solved according to the invention by a system according to the disclosure. The plant according to the disclosure is preferably a plant for applying material to substrates and for analyzing the application of material. The plant preferably comprises at least: a material application and analysis device according to the disclosure. Furthermore, an actuator device for generating a relative movement between the substrate and the material application and analysis device is preferably provided. The actuator device can here be effected by one or more robot arms, in particular 6-axis robot arm or more than 6-axis robot arm or 9-axis robot arm or up to 9-axis robot arm, and/or by a conveyor belt or a continuously conveying transport device. Preferably, the analysis device is arranged fixed in space and the substrate is moved past the analysis device, e.g., by means of the robot arm or the transport device. Alternatively, it is possible that the substrate is held spatially fixed and the analyzing device is moved relative to the substrate, e.g., by means of the robot arm or the transport device. Furthermore, it is possible that the substrate and the analyzing device are moved in space, whereby the substrate is preferably moved by means of the robot arm and/or the transport device and the substrate is preferably moved by means of a further robot arm, and/or the or a further transport device.

As a result of the relative movement, according to a further preferred embodiment of the present disclosure, portions of the first material application are first conveyable into the region of the first radiation source and detection device assembly and thereafter conveyable into the region of the material application element. Preferably, the material application element is capable of applying the second material application directly to the substrate or to the first material application. Preferably, the second material application is conveyable into the region of the second radiation source and detection device assembly after its application or generation. This embodiment is advantageous because analysis of the first material application can be performed upstream of the material application element through which the second material application is applied to the substrate. Further, the analysis of the second material application can be performed in the post-run, i.e., after the material application by the material application element. Thus, the material application and analysis device can perform at least or exactly or up to 3 objects simultaneously, namely analysis of a physical parameter of the first material application, application of the second material application and analysis of a geometrical parameter of the second material application. It is highly advantageous that the material application and analysis device can be implemented with a very compact design.

Furthermore, the above-mentioned object is solved by a method according to the disclosure. The method according to the disclosure is preferably a method for generating and monitoring a substrate coating. The method thereby preferably comprises at least the step of providing a substrate.

A first material application is thereby provided on the substrate, at least in sections. The first material application may alternatively be referred to as material modification or first material modification, in which case the second material application may be referred to as first material application.

Further, the method comprises the step of providing a material application and analysis device, wherein the material application and analysis device comprises at least: a material application element for applying a second material application to the substrate provided with the first material application at least in sections, a first radiation source and detection device assembly, said first radiation source and detection device assembly comprising at least a first radiation source for projecting at least one light line onto said first material application and a first optical detection device associated with said first radiation source for detecting said light line and for generating first image data, said first image data representing said detected light line, wherein said first radiation source is preferably fixedly aligned with respect to said first optical detection device and a second radiation source and detection means assembly, said second radiation source and detection means assembly comprising at least one second radiation source for projecting at least one further light line onto said second material application and a second optical detection means associated with said second radiation source for detecting said further light line and for generating second image data, the second image data representing the detected further light line, the second radiation source preferably being fixedly aligned with respect to the second optical detection means, and processing means for processing the first image data generated by the first detection means and the second image data generated by the second detection means.

Additionally or alternatively, the material application and analysis device may comprise an evaluation device for evaluating the first image data generated by the first detection device and the second image data generated by the second detection device. The evaluation device can preferably comprise evaluation means for parameter-dependent evaluation of the first image data, in particular the 2D image data, and the second image data, in particular the 3D image data, wherein either the first image data or the second image data are evaluated with respect to a physical parameter and wherein the image data which are not evaluated with respect to the physical parameter are evaluated with respect to a geometric parameter.

Further, the material application and analysis device comprises control means for driving the first radiation source and detection device assembly and for driving the second radiation source and detection device assembly, wherein the material application device is arranged between the first radiation source and detection device assembly and the second radiation source and detection device assembly.

Further, the method according to the disclosure comprises the step of applying the second material application to the first material application by means of the material application member. Further, the method according to the disclosure comprises the step of projecting a light line by means of the first radiation source onto the first material application and detecting the first light line by means of the first detection means, wherein the step of projecting the light line by means of the first radiation source onto the first material application and detecting the first light line by means of the first detection means is performed in advance of the application of the second material application.

Furthermore, the method according to the disclosure comprises the step of projecting a further light line by means of the second radiation source onto the second material application and detecting the further light line by means of the second detection device, wherein the step of projecting the light line by means of the second radiation source onto the second material application and detecting the second light line by means of the second detection device takes place in the downstream run for the application of the second material application.

The control device controls the first radiation source and detection device assembly and the second radiation source and detection device assembly preferably in a time-shifted manner, in particular alternately, wherein the first detection device generates the first image data, in particular in dependence on the operation of the first radiation source or in dependence on the configuration of the substrate, and wherein the second detection device generates the second image data, in particular in dependence on the operation of the second radiation source or in dependence on the configuration of the substrate. Further, the method comprises the step of processing the first image data and the step of processing the second image data, wherein the first image data represents a physical parameter of the light line(s) projected onto the first material deposit and wherein the second image data represents a geometric parameter of the light line(s) projected onto the second material deposit. Further, the method comprises the step of evaluating the processed first image data with respect to the physical parameter and evaluating the processed second image data with respect to the geometric parameter.

Thus, by means of the method according to the disclosure, a surface coating applied to the substrate can be detected in advance (relative to the application nozzle) and a structure applied to the substrate and/or to the surface coating or the first material application can be detected in retrospect (relative to the application nozzle). Both detections can be performed in one sequence.

Additionally or alternatively, a surface coating applied to the substrate can be detected in advance (relative to the application nozzle) with simultaneous detection of a reference substrate surface, and a structure applied to the substrate and/or to the surface coating or the first material application can be detected in retrospect (relative to the application nozzle) in a sequence with formation of a difference calculation of the applied structure to the reference substrate surface.

Alternatively, it is possible that instead of the first material application, the substrate surface is optically detected and evaluated with respect to the physical parameter. For example, a reference reflectance of the substrate surface can be detected upstream (relative to the application nozzle) and the surface coating applied to the substrate surface can be detected downstream (relative to the application nozzle). Preferably, this is done in a sequence and with the formation of a difference calculation of the reflection of the applied coating to the reference reflection.

Alternatively, it is possible that instead of the first material application, the substrate surface is optically detected and evaluated with respect to the physical parameter.

For example, a reference substrate surface can be detected upstream (relative to the application nozzle) and the structure applied to the substrate surface can be detected downstream (relative to the application nozzle), both preferably in a sequence forming a difference calculation of the applied structure to the reference substrate surface.

Furthermore, the above-mentioned object is solved by a further method according to the disclosure. The method according to the disclosure is preferably a method for generating and monitoring a substrate coating. The method preferably comprises at least the step of providing a substrate. A first material application is provided on the substrate, at least in sections. The first material application may alternatively be referred to as material modification or first material modification, in which case the second material application may be referred to as first material application. Further, the method comprises the step of providing an analysis device, in particular a material application and analysis device for optically monitoring at least two material applications applied or generated on a substrate, wherein the analysis device comprises at least: a first radiation source and detection device assembly, said first radiation source and detection device assembly comprising at least a first radiation source for projecting at least one line of light onto said first material deposit and a first optical detection device associated with said first radiation source for detecting said line of light and for generating first image data and for generating second image data, said first image data representing a physical parameter of said detected light line and said second image data representing a geometrical parameter of said detected light line, said first radiation source preferably being fixedly aligned with respect to said first optical detection means, and processing means for processing said generated first image data and said generated second image data. Additionally or alternatively, the analysis device may comprise an evaluation device for evaluating the first image data generated by the first detection device and the second image data generated by the second detection device. The evaluation device preferably comprises evaluation means for parameter-dependent evaluation of the first image data, in particular the 2D image data, and the second image data, in particular the 3D image data, wherein either the first image data or the second image data are evaluated with respect to a physical parameter and wherein the image data which are not evaluated with respect to the physical parameter are evaluated with respect to a geometric parameter. In other words, this means that the first image data or the second image data are evaluated with respect to a first parameter and wherein the first image data or the second image data are evaluated with respect to a second parameter, wherein the first image data and the second image data are evaluated with respect to the first parameter or the second parameter only and wherein the first image data and the second image data are evaluated with respect to different parameters.

Furthermore, the analysis device comprises a control device for controlling the first radiation source and detection device assembly, wherein the first radiation source and detection device assembly is preferably an assembly comprising exactly one radiation source and preferably exactly one detection device configured as a camera, wherein the control device controls the first radiation source and detection device assembly, wherein the first detection device generates the first image data or the second image data, in particular depending on the configuration of the substrate. The camera can be designed as a CCD or CMOS camera.

The configuration can be e.g., a first configuration, according to which the substrate is provided with the first material application and not or not yet with the second material application. According to a second configuration, the substrate may be provided with a second material application which is different from the first material application or which is an alternative material application. According to a further or third configuration, the substrate can be provided with the first material application and on the first material application, in particular on parts of the first material application, the second material application is applied or will be applied. It should be noted here that the designations "first", "second", "third" or "further" configuration do not specify any order. Thus, it is also possible that the substrate comprises the "third" configuration without the first or second configuration being present.

Further, the method comprises the step of projecting a light line by means of the first radiation source onto the first material deposition and detecting the light line by means of the first detection means, wherein the first image data is generated, in particular by the first detection means.

Further, the method comprises the step of applying the second material application to the first material application by means of a material application element.

Further, the method comprises the step of projecting a light line by means of the first radiation source onto the second material application and detecting the light line by means of the first detecting means, wherein the second image data is generated, in particular by means of the first detecting means, wherein the step of projecting a light line by means of the first radiation source onto the first material application and detecting the light line by means of the first detection device takes place before the application of the second material application and is carried out several times, wherein the light lines projected thereby onto the substrate are projected onto one or more defined portions of the substrate, wherein this step is preferably effected completely before the application of the second material application to the first material application or is completely terminated before the application of the second material application to the first material application for the respective substrate, wherein the step of projecting a light line by means of the first radiation source onto the second material application and detecting the light line by means of the first detection means is performed after the application of the second material application or during the application of the second material application and is performed a plurality of times, wherein the light lines projected thereby onto the substrate are projected onto one or more defined portions of the substrate. Further, the method comprises the step of processing the first image data and the step of processing the second image data. Furthermore, the method comprises the step of evaluating the processed first image data with respect to the physical parameter and evaluating the processed second image data with respect to the geometric parameter. Thus, by means of the described method, a surface coating applied to the substrate can be detected in the wake (relative to the application nozzle) in a first sequence and a structure applied to the substrate and/or to the surface coating can be detected in the wake (relative to the application nozzle) in a second sequence.

This solution is advantageous because the first radiation source and detection device assembly for detecting the first and second image data can be a first radiation source and detection device assembly located downstream of the material application device. It is to be noted here that it is also possible according to this solution that, in addition to the first radiation source and detection device assembly, a second radiation source and detection device assembly and preferably also a third, fourth, fifth and sixth radiation source and detection device assembly are provided, wherein all, in particular all six, radiation source and detection device assemblies are arranged on a circular path, around a center, and are preferably identical in construction, wherein an actuator means is provided for generating a relative movement between the substrate and the material application and analysis means, wherein, in particular for the case of exclusive analysis of the first material application, the control means causes a re-registration of one of the remaining radiation source and detection device assemblies as the first radiation source and detection device assembly in dependence on the relative positions of the individual radiation source and detection device assemblies to the first material application. Additionally or alternatively, particularly in the case of exclusive analysis of the second material application, it is possible for the control means to cause re-registration of one of the radiation source and detection device assemblies as the first radiation source and detection device assembly in dependence on the relative positions of the individual radiation source and detection device assemblies to the first and/or second material application.

Alternatively, it is possible that instead of the first material application, the substrate surface is optically detected and evaluated with respect to the physical parameter. For example, a reference reflection of the substrate surface in the wake (relative to the application nozzle) can be detected in a first sequence. In particular, in a second sequence, the surface coating applied to the substrate surface can be detected in the wake (relative to the application nozzle). Preferably, this is done by calculating the difference between the reflection of the applied coating and the reference reflection from the first sequence.

Alternatively, a reference substrate surface can be detected in the wake (relative to the application nozzle) in a first sequence and the structure applied to the substrate surface can be detected in the wake (relative to the application nozzle) in a second sequence by forming a difference calculation of the applied structure to the reference substrate surface.

Furthermore, the above-mentioned object is solved by a further method according to the disclosure. The method according to the disclosure is preferably a method for generating and monitoring a substrate coating. The method preferably comprises at least the step of providing a substrate. Preferably, a first material application is provided on the substrate at least in sections. Furthermore, the method preferably comprises the step of providing a material application and analysis device. The material application and analysis device preferably comprises at least one material application element for applying a second material application to the substrate provided with the first material application at least in sections, a first radiation source and detection device assembly, the first radiation source and detection device assembly comprising at least one first radiation source for projecting at least one first light line, in particular laser line, onto the first material application and a second radiation source for projecting at least one second light line, in particular laser line, onto the first material application, onto the first material application and a first optical detection device associated with the first radiation source for detecting the first light line and for generating first image data, the first image data representing the detected first light line, the first radiation source preferably being fixedly aligned with respect to the first optical detection device, and a second radiation source and detection device assembly, the second radiation source and detection device assembly comprising at least one second radiation source for projecting at least one further light line, in particular laser line, onto the second material application, in particular laser line, onto the second material application and a second optical detection device associated with the second radiation source for detecting the further light line and for generating second image data, the second image data representing the detected further light line, wherein the second radiation source is preferably fixedly aligned relative to the second optical detection device and processing means for processing the first image data generated by the first detection means and the second image data generated by the second detection means, and control means for driving the first radiation source and detection means assembly and for driving the second radiation source and detection means assembly, wherein the measure application means is arranged between the first radiation source and detection means assembly and the second radiation source and detection means assembly.

Further, the method preferably comprises the step of applying the second material application to the first material application by means of the material application member and the step of projecting a first light line by means of the first radiation source onto the first material application and detecting the first light line by means of the first detection means, wherein the step of projecting the light line by means of the first radiation source onto the first material application and detecting the first light line by means of the first detection means is performed in advance of the application of the second material application, and the step of projecting a further light line by means of the second radiation source onto the second material application and detecting the further light line by means of the second detection device, wherein the step of projecting the further light line by means of the second radiation source onto the second material application and detecting the further light line by means of the second detection device takes place in the wake for application of the second material application, wherein the control means controls the first radiation source and detection device assembly and the second radiation source and detection device assembly respectively, in particular time-delayed or alternately, wherein the first detection device generates the first image data and wherein the second detection device generates the second image data and the step of processing the first image data and processing the second image data, wherein the first image data represents a first geometric parameter of the light line(s) projected onto the first material application and wherein the second image data represents a second geometric parameter of the light line(s) projected onto the second material application, and the step of evaluating the processed first image data with respect to the first geometric parameter and evaluating the processed second image data with respect to the second geometric parameter. Preferably, a device for carrying out this method is also provided. Additionally or alternatively, the present disclosure may relate to a system for carrying out one or more of the methods according to the disclosure.

According to a preferred embodiment of the present disclosure, the physical parameter is the intensity of reflected light from a plurality of consecutively detected light lines, wherein the image data representing the individual respective light lines detected in a defined portion of the substrate are processed, in particular interconnected, to generate 2D image data, and wherein the geometric parameter is the shape from a plurality of consecutively detected light lines, wherein the image data representing the individual respective light lines detected in a defined portion of the substrate are processed, in particular interconnected, to generate 3D image data. Particularly preferably, after the generation of the 2D image data, the 2D image data are analyzed with respect to the physical parameter, in particular the light intensity or the reflectance or the brightness in the image. Additionally or alternatively, after the generation of the 3D image data, the 3D image data are analyzed with respect to the geometrical parameter, in particular the shape, of the second material application represented by the 3D image data. In the case that a first geometric parameter and a second geometric parameter are acquired, 2D image data or 3D image data can be generated from the image data regarding the first geometric parameter and 2D image data or 3D image data can be generated from the image data regarding the second geometric parameter. The first geometric parameter can be a first shape, in particular the shape of the first material application or the shape of the substrate, in particular in a predetermined proportion. The second geometric parameter may thereby be a second shape, in particular the shape of the second material application, in particular in a predetermined proportion.

Alternatively, the aforementioned object can be solved by a device for automatically applying or generating and monitoring a structure to be applied to a substrate, preferably an adhesive bead, adhesive track, adhesive seam, sealing seam, foam profile, continuous profile, geometric profile, in particular a cylindrical profile or a triangular profile, or a weld seam. This device preferably comprises at least one application device for applying or producing the applied structure, an illumination device which is mounted on the application device or on a support structure of the application device, at least two cameras for optical detection of the applied structure, which are mounted on the application device or on the support structure of the application device opposite one another and offset with respect to the illumination device, and comprises an image evaluation unit for recognizing the applied structure, which is coupled to the cameras, wherein the illumination device emits one or more light paths which are respectively projected onto the substrate and the applied structure immediately after the application, and wherein the one or more light paths projected onto the substrate and the applied structure immediately after the application of the applied structure are detected in online operation by the cameras and the image evaluation unit in such a way that the image evaluation unit uses the change in the projected light path or light paths by means of calculation methods in order to determine at least one of the following features of the applied structure: The width of the applied structure and/or the height of the applied structure and/or the volume of the applied structure, in particular in each case with respect to the applied length of the applied structure including the height, the width and the profile or the shape of the applied structure and/or the position of the applied structure on the substrate. According to the disclosure, the device comprises a control device, wherein the control device can receive and evaluate movement data from a movement detection device, in particular a robotics system and/or a 3D sensor system, wherein the movement data describe a relative movement between the application device and the substrate, and wherein a treatment area of the substrate in which the structure is to be applied can be determined by means of the control device on the basis of the movement data prior to the application of the structure and/or the illumination device comprises at least two illuminant units, wherein each illuminant unit projects light onto the substrate in a plane, wherein plane portions in which the light of respective adjacent illuminant units is projected onto the substrate can be determined, in which the light of respective adjacent illuminant units extends intersect, wherein a drive device is provided for time-delayed drive of the adjacent illuminant unit in order to effect time-delayed illumination of the substrate and/or the structure to be applied by means of the illuminant unit and/or at least one camera is associated with each illuminant unit, the camera being oriented at a triangulation angle of less than 30° and/or the lighting device comprises at least one and preferably at least two luminous means pairs, the luminous means of the luminous means pair, in particular of the respective luminous means, projecting light in the same plane onto the substrate.

The use of the words "substantially" preferably defines, in all cases in which these words are used in the context of the present disclosure, a deviation in the range of 1%-30%, in particular of 1%-20%, in particular of 1%-10%, in particular of 1%-5%, in particular of 1%-2%, from the determination which would be given without the use of these words. Individual or all representations of the figures described in the following are preferably to be regarded as construction drawings, i.e., the dimensions, proportions, functional relationships and/or arrangements resulting from the figure or figures preferably correspond exactly or preferably substantially to those of the device or product according to the disclosure. Further advantages, objectives and features of the present disclosure are explained with reference to the following description of the accompanying drawings, in which devices according to the disclosure are illustrated by way of example. Elements of the devices and methods according to the disclosure, which at least substantially correspond in the figures with respect to their function, can be marked with the same reference lines, whereby these components or elements do not have to be numbered or explained in all figures.

BRIEF DESCRIPTION OF THE DRAWINGS

On the basis of the following drawings, advantageous embodiments of the disclosure are illustrated purely by way of example.

FIGS. 5a and 5b show different schematic views of the devices according to the disclosure, FIGS. 6a and 6b show further exemplary embodiments of the devices according to the disclosure, FIG. 7a shows a 3D representation generated from the acquired image data for the individual light lines, and FIG. 7b shows a further 3D representation, this 3D representation representing a smoothed representation of the image data shown in FIG. 7a, FIG. 7c shows a schematic representation of several light lines successively detected with respect to a physical parameter, and FIG. 7d a 2D representation, said 2D representation representing a smoothed representation of the image data shown in FIG. 7c.

DETAILED DESCRIPTION

Figure 1:
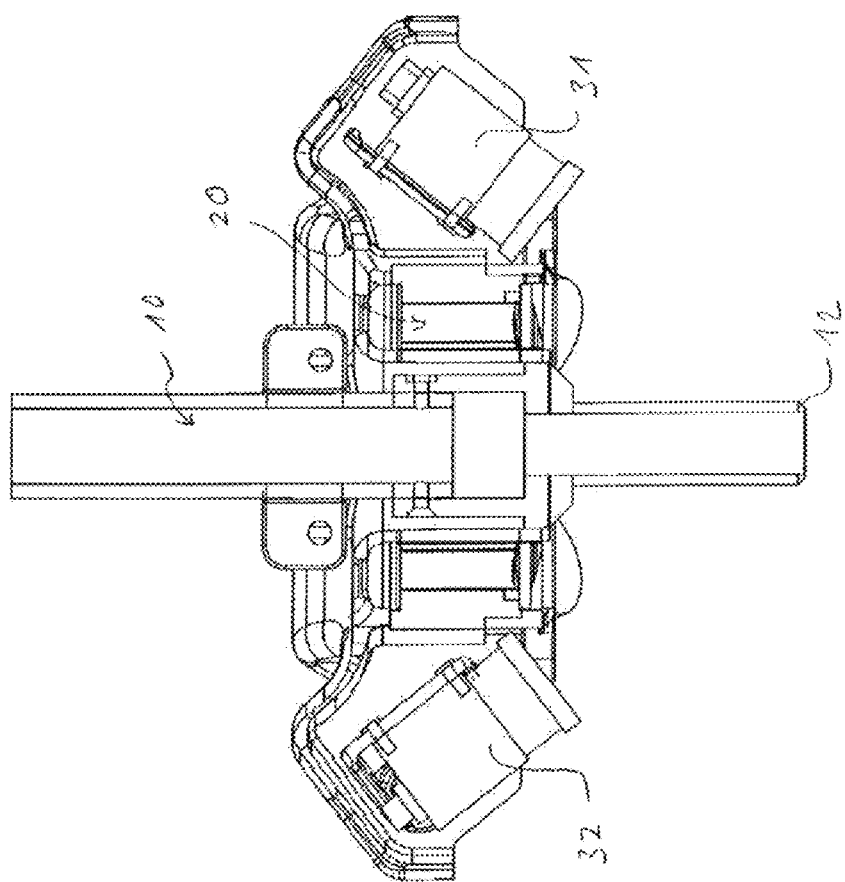
FIG. 1 shows a side view of an example of a device according to the disclosure during application and monitoring of an adhesive track.

According to FIG. 1, a device according to the disclosure for automatically applying and monitoring an adhesive track 6 on a substrate or component is shown. The device according to the disclosure comprises an application device 10, which comprises an application nozzle 12 at its lower end, for applying, for example, adhesive to a component. When the adhesive is applied, an illumination device 20, which is constructed, for example, from one or more LED diodes or one laser radiation source or a plurality of laser radiation sources, projects at least one light marking, in particular one light line or a plurality of light lines. The light line(s) can thereby generate, for example, a straight and/or curved, in particular curved light line(s). The light line(s), may additionally or alternatively be, for example, in the form of one or more preferably straight light path(s), in particular in the form of one or more straight light lines. Whereby at least one light line is projected onto the substrate and/or where at least one light line is projected onto the applied adhesive track or the applied structure and/or where a light line is projected onto the substrate, in particular at least onto a surface section provided with a material application, in particular primer and/or where a light line is projected onto the applied structure and the surface section provided with the material application, in particular primer. The illumination device 20 is attached to the application device 10 and thereby travels with the application device 10 during application of the adhesive when there is relative movement between the substrate 2 and the application device 10. However, it is possible for the device according to the disclosure to be designed exclusively as an analysis device. At least one camera 31 is again attached to the illumination device 20 for optical detection of the adhesive track. The camera 31 is preferably mounted laterally offset from the illumination device and on the projected light line, which is preferably projected onto the substrate close to the application gland 12. The cameras 31, 32 are connected to an image evaluation unit, not shown, which in online operation records and evaluates the images of the adhesive track obtained by the cameras, the image evaluation unit using the change in the projected light line by means of appropriate calculation methods to determine and thus check either the width and/or the height and/or the volume of the adhesive track.

In the embodiment of FIG. 1, the sensor head or the analysis device 1 with the illumination devices or radiation sources (cf. FIG. 4) and the cameras or detection devices (31-36) is firmly connected to the application device 10, at least one of the cameras 31-36 detecting the intersection area between the light line and the material application, in particular the second material application, in particular the adhesive track.

Figure 2:
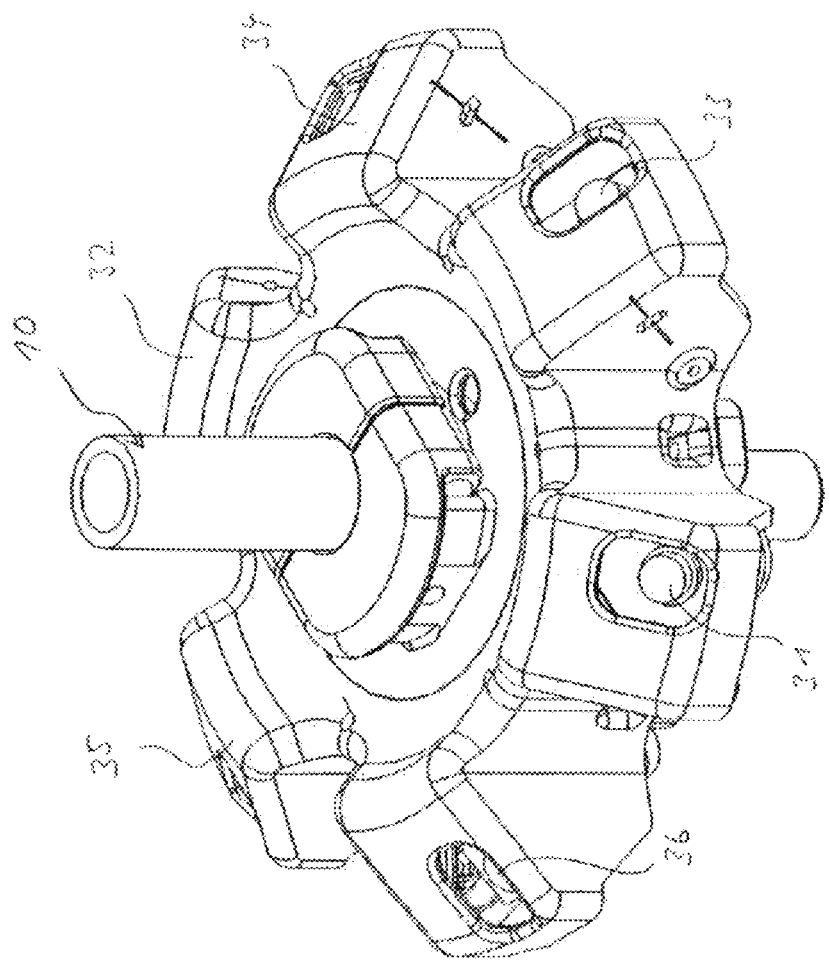
FIG. 2 shows a perspective view of the device according to the disclosure of FIG. 1.

In FIG. 2, the device according to the disclosure is shown in perspective. In this view, it is now apparent that six cameras 31 to 36 are preferably arranged concentrically around the application device 10. With such an arrangement of several cameras, the intersection area between a projected light line and the second material application, in particular adhesive track, is recorded at least by one or by exactly one or by only one camera, which is preferably located in the circular segment where the material application, in particular the adhesive track, can be dimensionally stable during application or can run. If the adhesive track takes an arc-shaped course, another camera can be activated for evaluation in order to monitor the course of the adhesive track. This applies to the entire circumference around the application device 10, depending on the course of the adhesive track.

Figure 3:
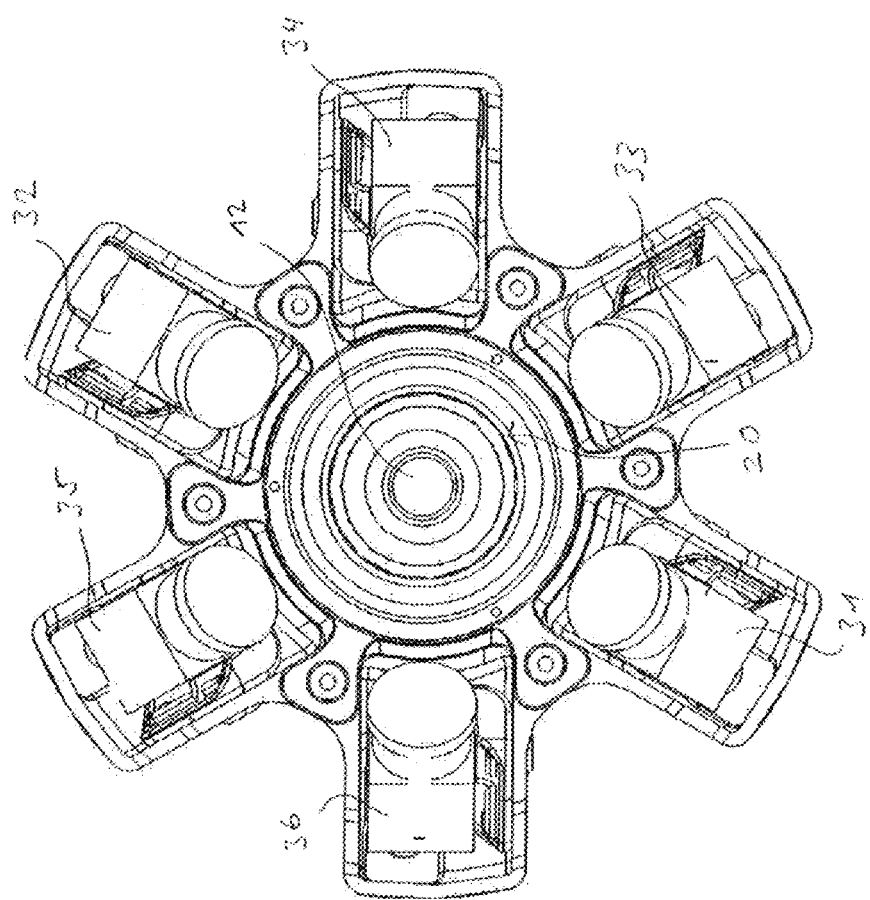
FIG. 3 is a top view from below of the device according to the disclosure of FIG. 1 and FIG. 2.

In FIG. 3, the device according to the disclosure is now shown from below. In the center of the device is the application gland 12, which is surrounded by the illumination devices 20-25 (cf. FIG. 4) in the form of LED light line projectors or laser line projectors as attached to the application device 10. The cameras 31 to 36 are uniformly spaced apart from one another and concentrically arranged around and aligned with the application gland 12. As an alternative to the plurality of radiation sources, only one radiation source may be provided, which may preferably be a ring projector and may preferably be arranged concentrically to the center of the analysis device 1. In the case of a ring projector, it is possible for the ring projector to emit, for example, a round line of light which is preferably at least partially reflected by the substrate and/or the material applications applied to the substrate. The ring projector may be an LED light projector or a laser light projector. The ring projector may be operated at a defined frequency and the detection devices may be operated in response to the frequency of the ring projector. Alternatively, the ring projector can emit light constantly.

Figure 4:
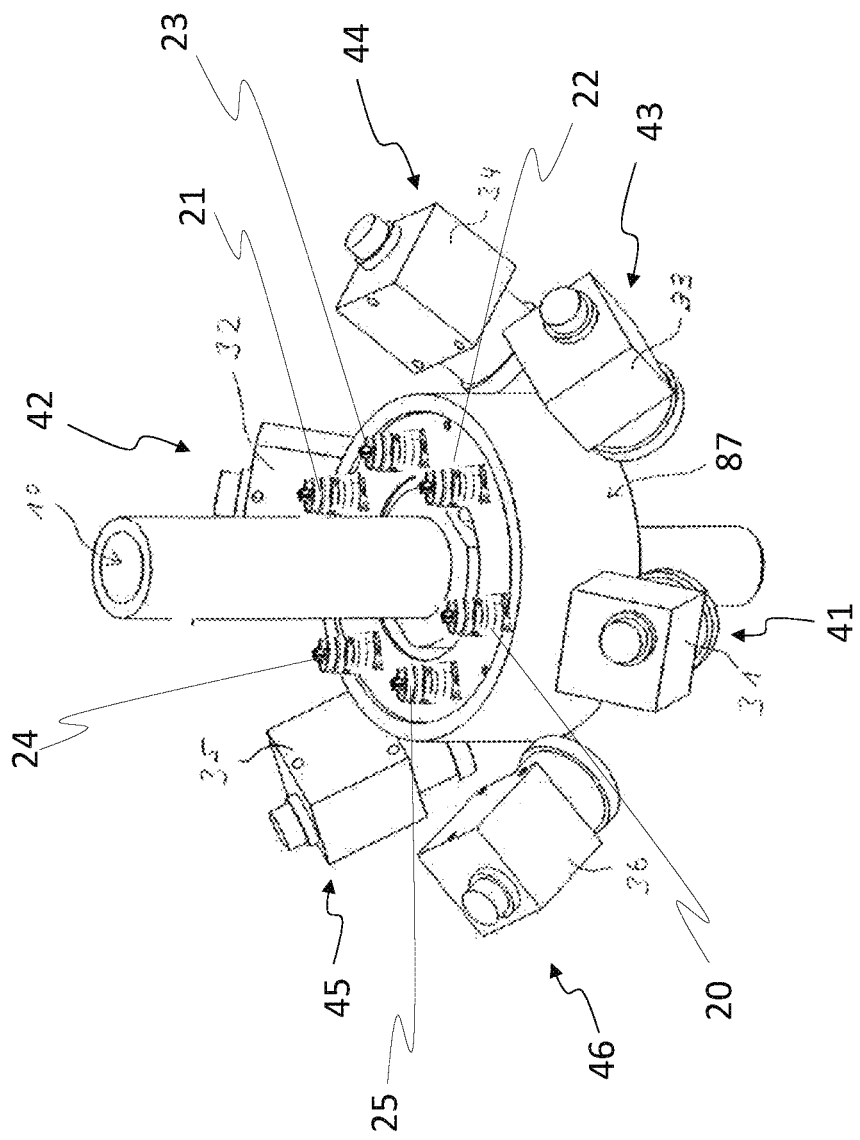
FIG. 4 is a schematic view of a further embodiment of the device according to the disclosure.

FIG. 4 shows a further embodiment of the device according to the disclosure. It can be seen from this illustration that the detection devices 31-36, in particular the cameras 31-36, are arranged laterally offset with respect to a center. Between the individual cameras 31-36 and the center, radiation sources 20-25 are preferably arranged. Preferably, each detection device 31-36 together with a radiation source 20-25 respectively forms a radiation source and detection device assembly 41-46. It should be noted here that the components (detection device and radiation source) of individual or several or all radiation source and detection device assembly(s) 41-46 are preferably to be understood as interacting functionally. For example, the radiation source 20 of the first radiation source and detection device assembly 41 emits radiation and the detection device 31 of the first radiation source and detection device assembly 41 detects that radiation (or the light reflected from the substrate and/or the material application(s)).

FIG. 5a shows an analysis device 1 according to the disclosure. for optically monitoring at least two material applications 4, 6 that can be applied or produced on a substrate 2. It can be seen in this illustration that the analysis device 1 comprises a holding frame 87 on which at least a first radiation source and detection device assembly 41 and a second radiation source and detection device assembly 42 are arranged (cf. FIG. 4). Thereby, the first radiation source and detection device assembly 41 preferably comprises at least one first radiation source 20 for projecting at least one light line 50, in particular a preferably straight laser line, onto the first material application 4. Furthermore, the first radiation source and detection device assembly 41 comprises a first optical detection device 31 associated with the first radiation source 20 for detecting the light line 50 and for generating first image data.

The first image data thereby represents the detected light line 50, wherein the detected light line or lines is or are represented by a physical parameter, the physical parameter preferably being the intensity of the reflected light.

It can be seen that the detected light line 50 in this embodiment is formed by a highly reflective portion 56 and two less reflective portions 57 and 58. Preferably, the strongly reflecting portion represents the first material application 4 or a material modification and the less strongly reflecting portions 57, 58 or more strongly scattering portions represent optically detected portions of the light line 50 which are not projected onto the first material application 4 or the material modification, but are adjacent thereto and are projected, for example, onto the adjacent substrate surface. This solution is advantageous, since the differently reflected portions of the light line 50 can be determined in the image data generated by the detection device. A 2D representation can then be generated from a plurality of successively generated image data (e.g., for the previously generated light lines indicated by the reference sign 59), which, on the basis of the differently strongly reflected light components of the individual light lines, permits the determination of an outer edge or both outer edges of the first material application 4 or material modification. Additionally or alternatively, the determination of the presence of the first material application 4 or material modification can be determined from this 2D image data. It is thus possible to determine whether the first material deposition 4 or material modification has been generated throughout or whether the first material deposition 4 or material modification has not been generated or present in sections or locally.

It is alternatively possible that the light line 50 is projected only on one side 57 or 58 of the first material application 4 or material modification onto the adjacent substrate surface.

Furthermore, it is alternatively possible that the light line 50, when the first material application 4 or material modification is correctly generated, is projected completely onto it and thus does not project beyond it. This solution is advantageous, since in the case of a very broadly (relatively) generated first material application 4 or material modification, the target area, which can be defined by the width of the light line 50, can be wider than the length of the light line 50.

The reference sign 59 indicates previously generated light lines detected by means of the detection device 31, whereby these light lines naturally do not continue to exist in an optically recognizable manner on the substrate or the first material application after completion of their generation, but are merely retained or made available by the generated image data. Thus, preferably light lines detected by the detection device 31, in particular all or defined or the majority of the light lines detected by the first detection device 31, are generated for the generation of 2D image data, in particular spatially resolved or in relation to the respective component location. The 2D image data can thereby be provided, stored or further processed, for example, in the form of one or more data files.

The first radiation source 20 is preferably fixedly aligned with respect to the first optical detection device 31, since both devices 20, 31 are preferably fixedly arranged on the holding frame 87.

The second radiation source and detection device assembly 42 preferably comprises at least a second radiation source 21 for projecting at least one further light line 51, in particular laser line, onto the second material application 6 and a second optical detection device 32 associated with the second radiation source 21 for detecting the further light line 51 and for generating second image data. The second radiation source and detection device assembly 42 is preferably fixedly disposed on the support frame 87, thus the second radiation source 21 is preferably fixedly aligned with respect to the second optical detection device 32.

The second image data thereby represents the detected light line 51, wherein the detected light line 51 or the detected light lines 67 is or are preferably represented by a geometric parameter, the geometric parameter preferably being the shape of the light line. The light lines 67 and 51 are therefore also represented completely homogeneously, since the image data representing these light lines are preferably generated exclusively with respect to the shape of the light line or represent the shape of the light line and therefore physical parameters, such as differences in the strength of the reflected light, are disregarded or are not mapped or represented by the generated image data.

The reference sign 67 indicates previously generated light lines detected by means of the detection device 32, whereby these light lines naturally do not continue to exist in an optically recognizable manner on the substrate 2 or the second material application 6 after completion of their generation, but are merely retained or made available by the generated image data. Thus, light lines preferably detected by the detection device 32, in particular all or defined or the majority of the light lines detected by the second detection device 32, are generated for generating 3D image data, in particular spatially resolved or in relation to the respective component location. The 3D image data can be provided, stored or further processed, for example, in the form of one or more files.

The reference sign 60 indicates a processing device 60 for processing the first image data generated by the first acquisition device 31 and the second image data generated by the second acquisition device 32. The processing device 60 is preferably in communication with the individual acquisition devices at least indirectly and preferably directly by means of data links.

The reference sign 62 indicates a control device 62, which preferably serves for driving the first radiation source and detection device assembly 41 and for driving the second radiation source and detection device assembly 42, wherein the control device 62 drives the first radiation source and detection device assembly 41 and the second radiation source and detection device assembly 42 preferably with a time delay, in particular alternately. The control device 62 is preferably in direct or indirect communication with the individual radiation source and detection device assemblies 41-46 by means of data link(s) and/or signal link(s).

The first detection device 31 preferably generates first image data. Here, the reference sign 71 indicates an optical detection area of the detection device 31, it can be seen that the detection area 71 on the substrate 2 is preferably wider and/or longer than the width and/or length of a light line 50 (on the substrate) emitted from the first radiation source 20. The reference sign 73 indicates a radiation area of the radiation emitted by the first radiation source 20, through which the light line 50 is projected onto the substrate 2 and/or the first material application 4.

The second detection means 32 preferably generates the second image data. Here, the reference numeral 72 indicates an optical detection area of the detection device 32, it can be seen that the detection area 72 on the substrate 2 is preferably wider and/or longer than the width and/or length of a light line 51 (on the substrate) emitted from the second radiation source 21. The reference sign 74 indicates a radiation area of the radiation emitted by the second radiation source 21 through which the light line 51 is projected onto the substrate 2 and/or the second material application 6.

Furthermore, the reference sign 64 indicates, purely schematically and purely exemplarily, an actuator device, wherein a relative movement between the substrate 2 and the analysis device 1 can be effected by the actuator device 64. The actuator device 64 can convey the substrate 2 in the direction 90 when the analysis device 64 is arranged in a spatially fixed manner, for example. The first radiation source and detection device assembly 41 is arranged in this constellation as performing a detection "in advance", and the radiation source and detection device assembly 42 is arranged in this constellation as performing a detection "in retardation".

FIG. 5b shows an alternative embodiment of the present disclosure. According to this embodiment, the analysis device 1 shown comprises a material application device 10. Alternatively, this arrangement may be referred to as a material application and analysis device 8.

Furthermore, the reference sign 64 indicates, purely schematically and purely exemplarily, an actuator device, wherein a relative movement between the substrate 2 and the analysis device 1 can be effected by the actuator device 64. The substrate 2 can, for example, be arranged fixed in space and the material application and analysis device 8 can be moved or conveyed relative to the substrate 2, for example, in the direction 90. The first radiation source and detection device assembly 41 is arranged in this constellation as performing a detection "in advance", and the radiation source and detection device assembly 42 is arranged in this constellation as performing a detection "in retardation". "Leading" in this context refers to the fact that the first radiation source and detection device assembly 41 analyzes portions of the substrate 2 which, prior to material application (second material application 6) by means of, for example, an application nozzle 12 of the application device 10 to the substrate 2 and/or the first material application 4, are guided past the first radiation source and detection device assembly 41 or are moved relative thereto. "Tracking" in this context refers to the second radiation source and sensing device assembly 42 analyzing portions of the substrate 2 that are moved past or relative to the second radiation source and sensing device assembly 41 after the material application (second material application 6) by means of, for example, an application nozzle 12 of the application device 10 to the substrate 2 and/or the first material application 4. The location at which the second material application 6 from the application nozzle 12 or out of the application device 10 impinges on the substrate 2 and/or the first material application 4 is indicated by the reference character 66. According to this embodiment, the actuator device 64 is schematically designed as a robot arm. It is possible here that the actuator devices 64 according to FIGS. 5*a* and 5*b* are exchanged or combined with each other. Furthermore, the actuator device 64 according to FIG. 5*a* or FIG. 5*b* provides location data or position data, in particular 3D position data of the actuator device, in particular of a robot, and/or movement data, in particular acceleration data and/or velocity data, these data preferably being provided to the processing device 60 and/or the control device 62. Preferably, the image data, in particular the 2D image data and/or the 3D image data are set or generated in relation to the location data or position data and/or movement data, in particular acceleration data and/or velocity data.

The reference sign 14 indicates a system which preferably comprises at least the actuator device 64 and the material application and analysis device 8.

FIG. 6*a* is substantially the same as FIG. 5*a*, wherein the light lines 50 and 51 shown in a detection interval are generated, the light lines preferably being generated sequentially and alternately. Preferably, radiation source and detection device assembly 41, 42, 43, 44, 45, 46 (cf. FIG. 4) are controlled sequentially or with a time delay to generate image data. Preferably, a defined sequence for controlling the radiation source and detection device modules 41, 42, 43, 44, 45, 46 is specified. Preferably, all radiation source and detection device assemblies 41, 42, 43, 44, 45, 46 are controlled per sequence, in particular exactly once, for generating a light line 50, 51, in particular a laser line, and for detecting the respective light line. However, for generating the 2D data, preferably only image data of the radiation source and detection device assembly 41 registered as the first radiation source and detection device assembly 41 is used, and for generating the 3D data, preferably only image data of the radiation source and detection device assembly 42 registered as the second radiation source and detection device assembly 42 is used. Preferably, each detection device is operated at a frequency greater than 1 Hz, in particular at a frequency greater than 100 Hz.

Further, FIG. 6*a* shows six radiation sources 20-25, each radiation source 20-25 preferably having exactly or at least one optical sensing device (only two shown) associated therewith.

FIG. 6*b* shows the material application and analysis device 8 applying the second material application 6 and optically detecting the first material application 4 or material modification and optically detecting the second material modification 6.

FIG. 7*a* shows a graphical representation generated from a plurality of image data, the image data corresponding to at least the second image data and representing the geometric parameter. Thus, the shown representation represents at least one 3D image or perspective view generated from the 3D image data. Further, it can be seen that the representation according to this example comprises a lighter portion 57, a darker portion 56, and a portion 58 that is again lighter than the darker portion 56. This may result from a combination of the 2D and 3D image data. Thus, it can be inferred from this one representation or the common image data or connected image data or combined image data representing this representation at which location the first material application 4 is defectively generated or applied and at which location the second material application 6 is defectively generated or applied. This is advantageous, since partially faulty applications of one material application 4 or 6 can compensate for faulty applications of another material application 4 or 6. Furthermore, for example, a certain number of defective applications of the first material application 4 in a section may be defined as problem-free, and a certain number of defective applications of the second material application 6 in the same section may also be defined as problem-free, whereby the total number of defective applications may be defined as problematic. Furthermore, it is conceivable that even the total number of defective applications may be defined as unproblematic as long as the defective applications occur at the same locations or at different locations, in particular locations spaced apart from each other in a defined manner.

The reference signs 81 and 82 indicate defective locations of the second material application 6. It can be seen that at these locations the shape of the second material application 6 deviates from the shape of the remaining portions of the second material application 6. At the points 81, 82, the second material application has been generated or applied with less material (per area), for example, and/or the second material application 6 has been "smeared" at these points, for example. The reference sign 83 identifies the pictorial representation of a light line previously captured and held in the form of the image data. The reference sign 84 indicates the second material application 6 represented by the image data.

It is generally possible for the 2D image data to be analyzed independently of the 3D image data. Alternatively, however, it is also possible for common image data or connected image data or combined image data to be generated from the 2D data and the 3D data. This common image data or connected image data or combined image data can then be analyzed with respect to the geometric parameter and the physical parameter.

FIG. 7*b* shows a representation resulting from the representation 7*a* or from the 3D image data underlying the representation 7*a*. According to this representation, a smoothing of the image data representing the light lines, in particular of the second image data and preferably of the second image data and the first image data, has been effected, in particular after their accumulation or combination.

FIG. 7*c* schematically shows a plurality of successively optically detected light lines 50, the individual light lines 50 preferably having been generated and detected successively. In the depiction shown, all light lines 50 comprise a comparable or identical appearance. Thus, these light lines 50 either represent a location at which the property to be examined, in particular the physical parameter, is realized to a sufficient degree or is not realized to a sufficient degree. It can be seen that a portion 56 of the light line 50 is shown stronger and/or darker and/or thicker in each case, representing a greater presence of the physical parameter, in particular the strength of the reflected light, than in the portions 57 and 58 adjacent thereto.

FIG. 7*d* shows a 2D representation generated from the data shown in FIG. 7*c*. It can thus be seen that the first material deposition 4 is shown darker compared to the strength of the reflected light of the substrate 2 due to other physical properties, in particular due to a greater strength of the reflected light. If the first material application 4 is not applied correctly or is applied incorrectly, bright spots would be visible in the area 56, for example.

The present disclosure can thus be used to carry out a method for generating and monitoring a substrate coating. Preferably, the method comprises at least the following steps: providing a substrate 2, wherein a first material application 4 is provided on the substrate 2 at least in sections; Providing an analysis device 1, in particular a material application and analysis device 8, in particular according to claim 9 or claim 10, for optically monitoring at least two material applications 4, 6 applied or produced on the substrate 2, wherein the analysis device 1 comprises at least: a first radiation source and detection device assembly 41, said first radiation source and detection device assembly 41 comprising at least a first radiation source 20 for projecting at least one light line 50, in particular laser line, onto the first material application 4 and a first optical detection device 31 associated with the first radiation source 20 for detecting the light line 50 and for generating first image data and for generating second image data, the first image data representing a physical parameter of the detected light line 50 and the second image data representing a geometrical parameter of the detected light line 50, wherein the first radiation source 20 is preferably fixedly aligned with respect to the first optical detection means 31, processing means 60 for processing the generated first image data and the generated second image data, control means 62 for controlling the first radiation source and detection means assembly 41, wherein the first radiation source and detection device assembly 41 is preferably an assembly comprising exactly one radiation source 20 and preferably exactly one detection device 31 formed as a camera 31, wherein the control means 62 controls the first radiation source and detection device assembly 41, wherein the first detection device 31 generates the first image data or the second image data; projecting a light line 50 by means of the first radiation source 20 onto the first material application 4, and detecting the light line 50 by means of the first detecting means 31, thereby generating the first image data; Applying the second material application 6 to the first material application 4 by means of a material application element 10, 12; projecting the light line 50 onto the second material application 6 by means of the first radiation source 20; and detecting the light line 50 by means of the first detecting means 31, wherein the second image data is generated, wherein the step of projecting a light line 50 by means of the first radiation source 20 onto the first material application 4 and detecting the light line 50 by means of the first detection means 31 takes place before the application of the second material application 6 and is carried out several times, wherein the light lines 50 projected thereby onto the substrate 2 are projected onto one or more defined portions of the substrate 2, wherein this step is preferably completed before the second material application 6 is applied to the first material application 4 for the respective substrate 2, wherein the step of projecting a light line 50 by means of the first radiation source 20 onto the second material application 6 and detecting the light line 50 by means of the first detection means 31 takes place after the application of the second material application 6 or during the application of the second material application 6 and is carried out several times, wherein the light lines 50 projected thereby onto the substrate 2 are projected onto one or more defined portions of the substrate 2; processing the first image data and processing the second image data; evaluating the processed first image data with respect to the physical parameter and evaluating the processed second image data with respect to the geometric parameter.

REFERENCE CHARACTER LIST 1 analysis device
2 substrate
4 first material application
6 second material application or structure applied or to be applied or adhesive track
8 Material application and analysis device
10 Application device
12 Application nozzle
14 equipment
20 first illumination device or detection device or radiation source or laser unit or LED unit
21 second illumination device or detection device or radiation source or laser unit or LED unit
22 third illumination device or detection device or radiation source or laser unit or LED unit
23 fourth illumination device or detection device or radiation source or laser unit or LED unit
24 fifth illumination device or detection device or radiation source or laser unit or LED unit
25 sixth illumination device or detection device or radiation source or laser unit or LED unit
31 first camera
32 second camera
33 third camera
34 fourth camera
35 fifth camera
36 sixth camera
41 first radiation source and detection device assembly
42 second radiation source and detection device assembly
43 third radiation source and detection device assembly
44 fourth radiation source and detection device assembly
45 fifth radiation source and detection device assembly
46 sixth radiation source and detection device assembly
50 first light line or laser line or LED line
51 additional or second light line or laser line or LED line
56 highly reflective portion of first light line
57 first weakly reflecting portion of the first light line
58 second weakly reflecting portion of the first light line
59 previously generated and optically detected light lines (shown for illustration purposes only)
60 processing device
62 control device
64 actuator device
66 location at which the second material deposit is applied to the substrate and/or the first material deposit is applied
67 previously generated and optically detected light lines (shown for illustration only)
71 schematically represented boundary of the optical detection range of the first detection device 31
72 schematically represented boundary of the optical detection range of the second detection device 32
73 schematically represented limitation of the radiation field of the laser radiation emitted by the first radiation source 20
74 schematically illustrated limitation of the radiation field of the laser radiation emitted by the second radiation source 21
79 3D image generated from the 3D image data
80 smoothed 3D image by smoothing the image data representing the 3D image 79
81 first defect or irregularity representing image data
82 second defect or irregularity representing image data
83 representation of the image data representing the shape of a second light line 84 representation of the image data representing the shape of the second material application
85 smoothed representation of the image data representing the shape of the second material application
87 holding frame
90 direction of movement

The invention claimed is:

1. An analysis device for optically monitoring at least two material applications, which can be applied or produced on a substrate, in one working step, wherein the material applications include at least a first material application and a second material application, wherein an analysis of the first material application can be effected in advance of the second material application being applied to the substrate by a material application element, and wherein an analysis of the second material application can be effected after the second material application by the material application element, the analysis device comprising:
   a first radiation source and detection device assembly, the first radiation source and detection device assembly comprising at least a first radiation source for projecting at least one light line onto the first material application member, and a first optical detection device associated with the first radiation source for detecting the at least one light line and for generating first image data,
   wherein the first image data represents the detected at least one light line,
   and
   a second radiation source and detection device assembly, wherein the second radiation source and detection device assembly comprises at least a second radiation source for projecting at least one further light line onto the second material application and a second optical detection device associated with the second radiation source for detecting the at least one further light line and for generating second image data,
   the second image data representing the detected at least one further light line,
   wherein the first image data represents a physical parameter of the at least one light line detected by the first optical detection device, and
   wherein the second image data represents a geometric parameter of the at least one further light line detected by the second optical detection device,
   wherein the first radiation source and detection device assembly and the second radiation source and detection device assembly are identical in construction,
   processing means for processing the first image data generated by the first optical detection device and the second image data generated by the second optical detection device, and
   control means for driving the first radiation source and detection device assembly and for driving the second radiation source and detection device assembly,
   wherein the control means, in dependence on relative positions of the individual radiation source and detection device assemblies for the first and/or second material application, is configured to initiate a re-registration of one of the radiation source and detection device assemblies as a first radiation source and detection device assembly and a re-registration of one of the remaining radiation source and detection device assemblies as a second radiation source and detection device assembly.

2. The analysis device according to claim 1, wherein the at least one light line comprises a plurality of light lines, the first optical detection device is configured to consecutively detect the plurality of light lines, the physical parameter is strength of reflected light from the plurality of consecutively detected light lines, and wherein the analysis device is configured to process the first image data representing individual respective light lines of the plurality of light lines detected in a defined portion of the substrate to generate 2D image data.

3. The analysis device according to claim 2, wherein the analysis device is configured to register a reference strength value or a reference strength value range, and evaluate the 2D image data with respect to the strength of the reflected light based on a comparison with the reference strength value or the reference strength value range, and wherein the analysis device is configured to determine whether the detected strength of the reflected light corresponds to the reference strength value or lies in the reference strength value range or whether the detected strength of the reflected light deviates from the reference strength value or lies outside the reference strength value range.

4. The analysis device according to claim 1, wherein the at least one light line comprises a plurality of light lines, and the first optical detection device is configured to consecutively detect the plurality of light lines, wherein the geometric parameter is shape of the at least one light line or the geometric parameter is shape of the plurality of consecutively detected light lines, and wherein the analysis device is configured to process the second image data representing individual respective light lines detected in a defined section of the substrate to generate 3D image data.

5. The analysis device according to claim 4, wherein the analysis device is configured to register a reference shape value or a reference shape value range, and evaluate the 3D image data with respect to the shape of the at least one light line based on a comparison with the reference shape value or the reference shape value range, and wherein the analysis device is configured to determine whether the detected shape of the light lines corresponds to the reference shape value or lies in the reference shape value range or whether the detected shape of the light lines deviates from the reference shape value or lies outside the reference shape value range.

6. The analysis device according to claim 1, wherein in addition to the first and second radiation source and detection device assemblies, the analysis device includes third, fourth, fifth and sixth radiation source and detection device assemblies, wherein all six radiation source and detection device assemblies are arranged on a circular path, around a center, and are identical in construction.

7. The analysis device according to claim 1, wherein each radiation source and detection device assembly is drivable to generate image data, wherein a sequence for driving the radiation source and detection device assembly is predetermined, wherein all radiation source and detection device assemblies are predetermined for each sequence for respectively generating a light line and for detecting the respective light line, wherein exclusively image data of the radiation source and detection device assembly registered as the first radiation source and detection device assembly are used for generating 2D data and wherein exclusively image data of the radiation source and detection device assembly registered as the second radiation source and detection device assembly are used for generating 3D data.

8. A material application and analysis device comprising:
   the analysis device according to claim 1,
   a material application element for applying the second material application to a substrate provided with the first material application at least in sections, wherein the material application element is arranged between the first radiation source and detection device assembly and the second radiation source and detection device assembly, wherein by means of the first radiation source and detection device assembly the first material application is detectable and wherein by means of the second radiation source and detection device assembly the second material application is detectable, wherein the first image data are processable and wherein the second image data are processable, wherein the material application and analysis device is configured to evaluate the processed first image data with respect to the physical parameter and wherein the material application and analysis device is configured to evaluate the processed second image data with respect to the geometric parameter.

9. The material application and analysis device according to claim 8, wherein the material application element is designed for applying a material bead.

10. A device for material application to substrates and for analysis of the material application, the device comprising:
the material application and analysis device according to claim 8, and
an actuator device for generating a relative movement between the substrate and the material application and analysis device.

11. The device for material application according to claim 10, wherein as a result of the relative movement, portions of the first material application are first conveyable into a region of the first radiation source and detection device assembly and thereafter conveyable into a region of the material application element, wherein the material application element is adapted to apply the second material application to the first material application, and the second material application is then conveyable into a region of the second radiation source and detection device assembly.

12. A method for generating and monitoring a substrate coating, at least comprising steps of:
providing a substrate,
providing a first material application on the substrate at least in sections,
providing a material application and analysis device, wherein the material application and analysis device comprises:
a material application element for applying a second material application to the substrate provided with the first material application at least in sections,
a first radiation source and detection device assembly, the first radiation source and detection device assembly comprising at least a first radiation source for projecting at least one first light line onto the first material application, and a first optical detection device associated with the first radiation source for detecting the at least one first light line and for generating first image data, the first image data representing the detected at least one first light line,
a second radiation source and detection device assembly, wherein the second radiation source and detection device assembly comprises at least a second radiation source for projecting at least one further light line onto the second material application and a second optical detection device associated with the second radiation source for detecting the at least one further light line and for generating second image data, the second image data representing the detected at least one further light line, a processing device for processing the first image data generated by the first optical detection device and the second image data generated by the second optical detection device,
a control device for driving the first radiation source and detection device assembly and for driving the second radiation source and detection device assembly,
wherein the material application element is disposed between the first radiation source and detection device assembly and the second radiation source and detection device assembly,
applying the second material application to the first material application by means of the material application element,
projecting a first light line by means of the first radiation source onto the first material application and detecting the first light line by means of the first optical detection device, wherein the step of projecting the first light line by means of the first radiation source onto the first material application and detecting the first light line by means of the first optical detection device takes place in advance of the application of the second material application,
projecting a further light line by means of the second radiation source onto the second material application and detecting the further light line by means of the second optical detection device,
wherein the step of projecting the further light line by means of the second radiation source onto the second material application and detecting the further light line by means of the second optical detection device takes place in the wake of the application of the second material application,
wherein the control device controls the first radiation source and detection device assembly and the second radiation source and detection device assembly respectively,
wherein the first optical detection device generates the first image data and wherein the second optical detection device generates the second image data,
processing the first image data, and processing the second image data, wherein the first image data represents a physical parameter of the at least one first light line projected onto the first material application, wherein the second image data represents a geometric parameter of the at least one further light line projected onto the second material application, and
evaluating the processed first image data with respect to the physical parameter, and evaluating the processed second image data with respect to the geometric parameter,
wherein the control device, in dependence on relative positions of the individual radiation source and detection device assemblies for the first and/or second material application, is configured to initiate a re-registration of one of the radiation source and detection device assemblies as a first radiation source and detection device assembly and a re-registration of one of the remaining radiation source and detection device assemblies as a second radiation source and detection device assembly.

13. A method for generating and monitoring a substrate coating, at least comprising steps of:
providing a substrate,
wherein a first material application is provided on the substrate at least in sections, providing an analysis device for optically monitoring at least two material applications applied or produced on the substrate, wherein the analysis device comprises:
a first radiation source and detection device assembly, wherein the first radiation source and detection device assembly comprises at least a first radiation source for projecting at least one light line onto the first material application and a first optical detection device associated with the first radiation source for detecting the at least one light line and for generating first image data and for generating second image data, the first image data representing a physical parameter of the detected at least one light line and the second image data representing a geometric parameter of the detected at least one light line,
a processing device for processing the generated first image data and the generated second image data,
a control device for controlling the first radiation source and detection device assembly,
wherein the first optical detecting device generates the first image data or the second image data,
projecting a light line by means of the first radiation source onto the first material application and detecting the light line by means of the first optical detection device, thereby generating the first image data,
applying the second material application to the first material application by means of a material application element,
projecting a light line onto the second material application by means of the first radiation source, and detecting the light line by means of the first optical detection device, whereby the second image data is generated,
wherein the step of projecting a light line by means of the first radiation source onto the first material application and detecting the light line by means of the first optical detection device takes place before the application of the second material application and is carried out several times, wherein the light lines thereby projected onto the substrate are projected onto one or more defined portions of the substrate,
wherein the step of projecting a light line by means of the first radiation source onto the second material application and detecting the light line by means of the first optical detection device takes place after the application of the second material application or during the application of the second material application and is carried out several times, wherein the light lines projected thereby onto the substrate are projected onto one or more defined portions of the substrate,
processing the first image data and processing the second image data,
evaluating the processed first image data with respect to the physical parameter, and evaluating the processed second image data with respect to the geometric parameter,
wherein the control device, in dependence on relative positions of the individual radiation source and detection device assemblies for the first and/or second material application, is configured to initiate a re-registration of one of the radiation source and detection device assemblies as a first radiation source and detection device assembly and a re-registration of one of the remaining radiation source and detection device assemblies as a second radiation source and detection device assembly.

14. A method for generating and monitoring a substrate coating, comprising steps of:
providing a substrate, wherein a first material application is provided on the substrate at least in sections,
providing a material application and analysis device, wherein the material application and analysis device comprises:
a material application element for applying a second material application to the substrate provided with the first material application at least in sections,
a first radiation source and detection device assembly, wherein the first radiation source and detection device assembly comprises at least a first radiation source for projecting at least a first light line onto the first material application and a first optical detection device associated with the first radiation source for detecting the first light line and for generating first image data, the first image data representing the detected first light line,
a second radiation source and detection device assembly, wherein the second radiation source and detection device assembly comprises at least a second radiation source for projecting at least a further light line onto the second material application and a second optical detection device associated with the second radiation source for detecting the further light line and for generating second image data, the second image data representing the detected further light line,
a processing device for processing the first image data generated by the first optical detection device and the second image data generated by the second optical detection device,
a control device for driving the first radiation source and detection device assembly and for driving the second radiation source and detection device assembly,
wherein the material application element is disposed between the first radiation source and detection device assembly and the second radiation source and detection device assembly,
applying the second material application to the first material application by means of the material application element,
projecting a first light line by means of the first radiation source onto the first material application and detecting the first light line by means of the first optical detection device, wherein the step of projecting the first light line by means of the first radiation source onto the first material application and detecting the first light line by means of the first optical detection device takes place in advance of the application of the second material application,
projecting a further light line by means of the second radiation source onto the second material application and detecting the further light line by means of the second optical detection device, wherein the step of projecting the further light line by means of the second radiation source onto the second material application and detecting the further light line by means of the second optical detection device takes place in the wake of the application of the second material application,
wherein the control device controls the first radiation source and detection device assembly and the second radiation source and detection device assembly respectively,
wherein the first optical detection device generates the first image data and wherein the second optical detection device generates the second image data, processing the first image data and processing the second image data, wherein the first image data represents a first geometric parameter of the first light line projected onto the first material application, and wherein the second image data represents a second geometric parameter of the further light line projected onto the second material application, evaluating the processed first image data with respect to the first geometric parameter, and evaluating the processed second image data with respect to the second geometric parameter, wherein the control device, in dependence on relative positions of the individual radiation source and detection device assemblies for the first and/or second material application, is configured to initiate a re-registration of one of the radiation source and detection device assemblies as a first radiation source and detection device assembly and a re-registration of one of the remaining radiation source and detection device assemblies as a second radiation source and detection device assembly.

15. The method according to claim 12, wherein the physical parameter is intensity of reflected light from a plurality of consecutively detected first light lines, wherein the first image data representing the individual respective first light lines detected in a defined section of the substrate are processed to generate 2D image data, and wherein the geometric parameter is shape of a plurality of successively detected further light lines, wherein the second image data representing the individual respective further light lines detected in a defined section of the substrate are processed to generate 3D image data.

16. The analysis device according to claim 1, wherein the first radiation source is configured to project the at least one light line as at least one laser line, and the second radiation source is configured to project the at least one further light line as at least one further laser line.

17. The analysis device according to claim 1, wherein the first radiation source is fixedly aligned with respect to the first optical detection device, and the second radiation source is fixedly aligned with respect to the second optical detecting device.

18. The method of claim 12, wherein the first radiation source is fixedly aligned with respect to the first optical detection device, and the second radiation source is fixedly aligned with respect to the second optical detecting device.

19. The method of claim 13, wherein the first radiation source is fixedly aligned with respect to the first optical detection device.

* * * * *